Aug. 28, 1934. J. KRASNODMSKY 1,971,377
SAFETY PARACHUTE FOR AEROPLANES
Filed Jan. 1, 1931 3 Sheets-Sheet 1

Inventor
John Krasnodmsky
By [signature]
Attorneys

Aug. 28, 1934.  J. KRASNODMSKY  1,971,377
SAFETY PARACHUTE FOR AEROPLANES
Filed Jan. 1, 1931  3 Sheets-Sheet 2
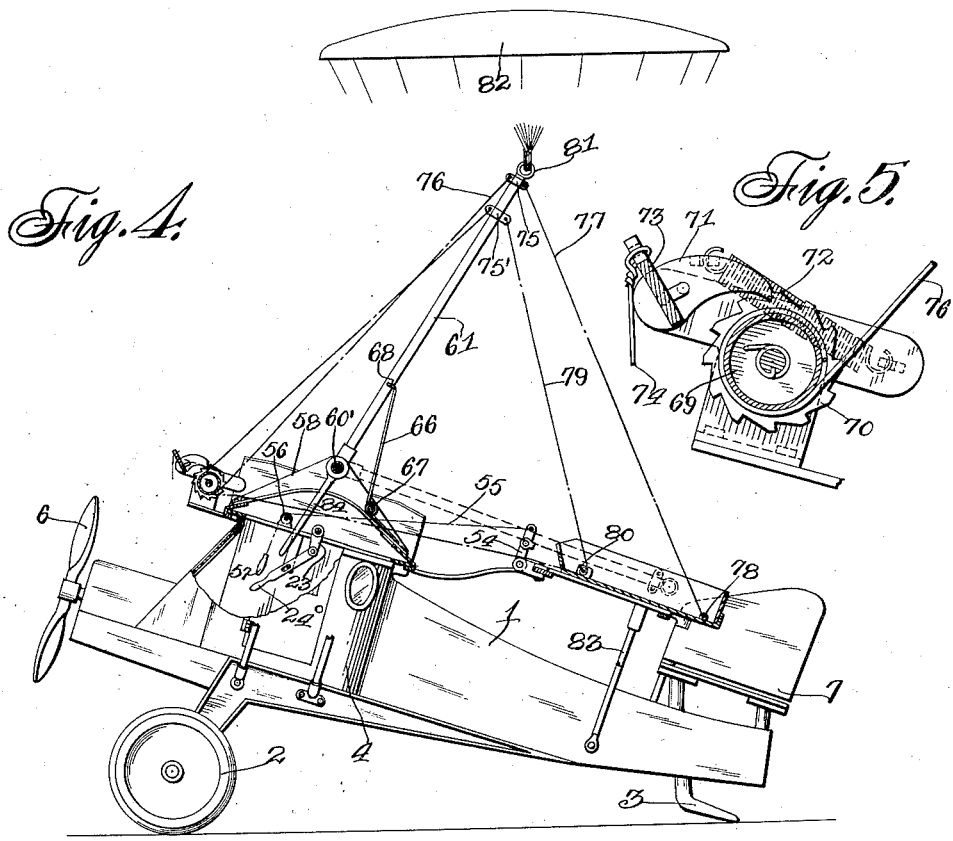
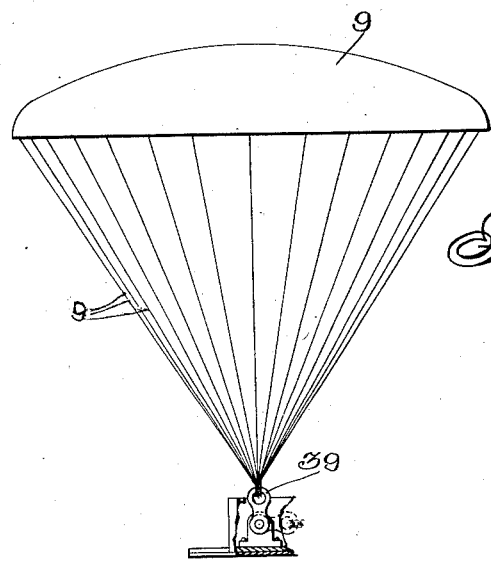
Inventor
John Krasnodmsky
By
Attorneys Aug. 28, 1934.    J. KRASNODMSKY    1,971,377
SAFETY PARACHUTE FOR AEROPLANES
Filed Jan. 1, 1931    3 Sheets-Sheet 3

Inventor
John Krasnodmsky
By
Attorneys

Patented Aug. 28, 1934

1,971,377

UNITED STATES PATENT OFFICE 1,971,377

SAFETY PARACHUTE FOR AEROPLANES

John Krasnodmsky, Milwaukee, Wis., assignor of fifteen per cent to Anton J. Koss, Milwaukee, Wis.

Application January 1, 1931, Serial No. 505,991

2 Claims. (Cl. 244—21)

This invention relates to improvements in safety parachutes for heavier than air machines, such as aeroplanes and the like.

One of the objects of the present invention is the provision of safety parachutes adapted to be used in connection with aeroplanes and the like for retarding the descent of the plane should any accident occur to the motor which would prevent the plane from being retained in the air through the use of the motor, so as to permit landing of the plane without unnecessary damage.

Another object of the present invention is the provision of safety parachutes for aeroplanes and the like which are housed in suitable receptacles on the top of the plane and adapted to be released from the cockpit so that they will readily assume an operative restraining position to retard the descent of the plane, but when not in use, will be enclosed in the housings entirely out of the way.

Another object of the present invention is the provision of safety parachutes for aeroplanes which are attached to the plane and normally contained within suitable housings carried by the plane, so that they can be folded up into the housings when not in use, and means is provided whereby these parachutes can be quickly expelled from the housings through the medium of suitable mechanism controlled from the cockpit of the plane.

A further object of the present invention is the provision of safety parachutes for aeroplanes normally contained within suitable housings carried by the plane wherein the covers for the housings are normally maintained in a closed position, and means is provided for releasing these cover members, said means actuated from the cockpit of the plane, and suitable means is arranged within the housings for expelling the parachutes therefrom upon releasing of the cover members, so that the parachutes will readily assume an operative position for retarding the descent of the plane.

With the above and other objects in view, the invention consists in the novel features of construction, the combination and arrangement of parts hereinafter more fully set forth, pointed out in the claims and shown in the accompanying drawings wherein:

Figure 4 is a side elevation with parts thereof broken away and illustrated in cross section;

Figure 5 is a detailed sectional view through the winding drum;

Figure 6 is a detailed section through a portion of one of the housings showing one of the parachutes in expanded position;

Figure 1:
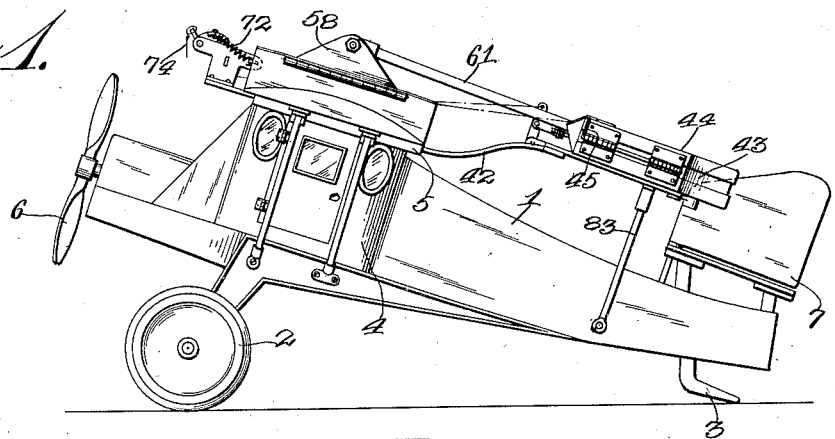
Figure 1 is a side elevation of an aeroplane equipped with my improved safety parachutes.

In the accompanying drawings, there is illustrated an aeroplane which includes the fuselage 1 having the usual three-point landing gear which includes the wheels 2 and the bearing point 3. The plane is equipped in the present instance with a cabin portion 4 and the cross wing 5 is arranged above the cabin with a propeller 6 for use in operating the machine.

The usual steering apparatus 7 is arranged at the rear end of the fuselage and in fact the general construction of the plane may be of any well known type.

As stated heretofore, one of the objects of the present invention is the provision of safety parachutes adapted to be attached to the plane and normally maintained in housings or casings carried by the plane and arranged ready for use should anything happen to cut off the motor or release the plane of its propulsion power.

Figure 2:
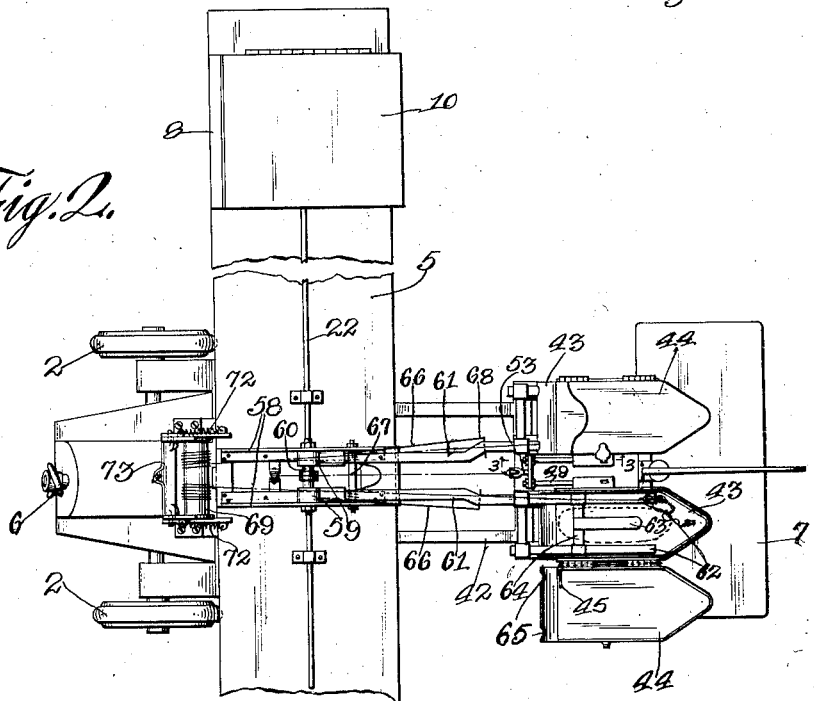
Figure 2 is a top plan view with one of the housings or compartments in open position.
Figure 3:
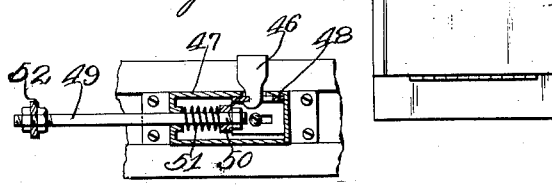
Figure 3 is a detailed sectional view on the line 3—3 of Figure 2.

As noted in Figure 2, the main wing 5 supports adjacent each end thereof, the housings 8 which are adapted to enclose suitable parachutes such as indicated at 9 in Figure 6.

It will be noted in the structure that there are two housings 8 and each housing contains a parachute, the housings being arranged at equal distances from the center of the plane, so that when the parachutes are released it will provide an even balance for the plane.

As the mechanism for retaining each parachute and for releasing are the same, only one of the structures referred to will be hereinafter described.

Figure 7:
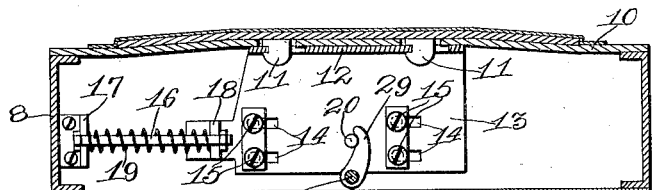
Figure 7 is a detailed section through one of the housings carried by the wing of the plane.
Figure 8:
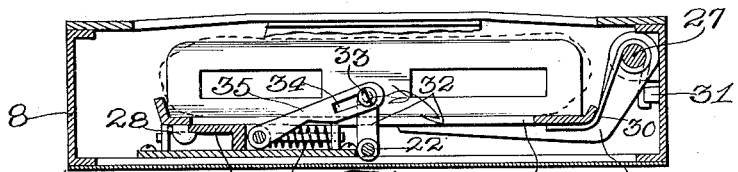
Figure 8 is a detailed section of the housing showing the release mechanism for the parachute; and, Figure 9 is a plan view of one of the housings on the wing of the plane with the cover in open position.

The housing 8 carries a cover 10 provided with spaced lugs 11 which are recessed to receive the horizontal portion 12 of the movable locking plates 13. These plates 13 having spaced slots 14 in which are arranged the guide pins 15. At one end of the plate 13 is attached a rod 16. The other end of the rod is attached to a bracket 17 carried by the housing 8. Arranged upon the rod 16 and positioned between the bracket 17 and an outstanding ear 18 is a coil spring 19 which normally maintains the plate 13 in locking position as shown in Figure 7.

The plate 13 carries a pin 20 and engaged with this pin is a hook member 21 carried by a shaft 22. This shaft 22 extends longitudinally of the wing 5 and also can extend into the second housing 8 at the other end of the wing. Projecting from the shaft 22 above the cockpit in the cabin 4, is a link 23 to which is pivotally connected a hand lever 24.

The body of the lever 24 is provided with a slot adapted to receive a stationary pin carried by a bracket suspended from the roof of the cockpit, whereby sliding movement of the lever 24 on its supporting pin will actuate arm 23 and rotate the shaft 22.

Arranged within each housing 8 is a movable tray 25, supported upon an angular member 26 which is pivoted upon the cross shaft 27. The tray 25 carries the catch members 28 adapted to engage a movable locking plate 29 in the housing.

In this instance, the catch members 28 are either formed integral with, or carried by the tray which receives and supports the parachutes.

Surrounding the shaft 27 is a spring 30, one end of which bears against a block 31 carried by the housing, while the other end is positioned beneath the supporting tray 25.

Figure 9:
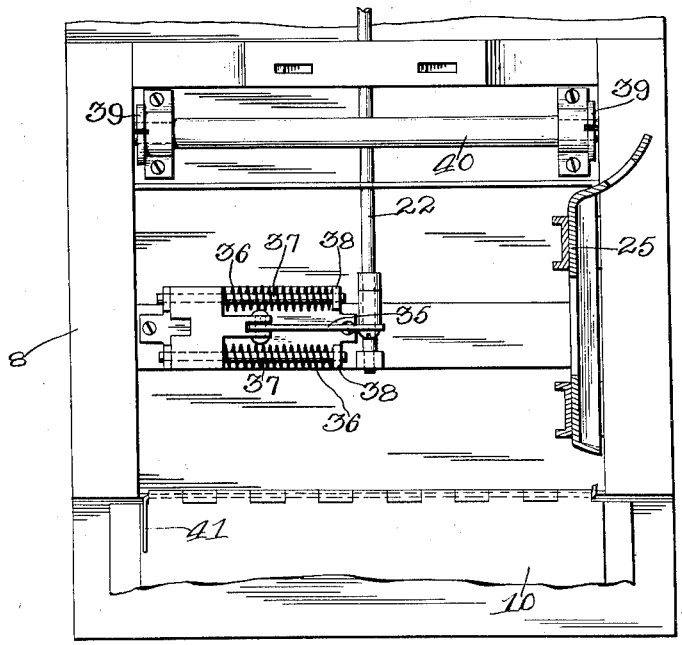

Arranged within each housing 8 and connected with the shaft 22 is a link 32 which carries a pin 33 at its outer end, adapted to move in a slot 34 in the actuating lever 35 which reciprocates the plate 29 to disengage the same from the catch 28. The tray or support 25 for the parachute, arranged in each housing, can be moved to a discharging position shown in Figure 9, by means of the spring 30, immediately following the release of the plate 29 from the catch member 28. The plate 29 is normally retained in engagement with the catch member 28 for retaining the tray 25 in a supporting position by means of coil springs 36, mounted on rods 37 which are carried by the plate 29 and the stationary apertured ears 38, as shown in Figure 9.

It will, therefore, be apparent that when the lever 24 is pushed upwardly to rock shaft 22 to release the hooks 11, the pin 33 will move to the inner end of the slot 34. However, as soon as the lever 24 is rocked upon its pivot to rotate the shaft 22, the pin 33 will be moved to the outer end of the slot 34 where further continued movement of the shaft 22 will cause the plate 29 to be disengaged from the hook or catch 28.

As soon as the plate 29 is disengaged from the hooks or catches 28, the tension of the spring 30 will raise the tray 25 within the housing to expel the parachutes supported thereby from the housing. As shown in Figure 6, the parachute 9 is provided with a number of cords 9' which are divided into two sets, with one set of cords attached to each of the movable plates 39, which are rockably mounted on the ends of the shaft 40.

The covers 10 when released are quickly moved to an open position due to the fact that the hinges carry suitable spring members 41 which have a tendency to normally urge the covers toward an open position. The shaft 22 extends along the upper side of the wing 5 and projects into each one of the housings 8 adjacent each end of the wing.

Supported by means of a suitable frame-work 42 are the spaced housings 43 which are arranged at the rear of the main wing 5 and preferably at the transverse center thereof, as shown in Figure 2. These housings 43 are normally closed by means of the covers 44 which are normally urged to an open position by means of the springs 45.

Each cover member 44 carries a catch 46 which is adapted to project through an aperture in a housing 47 and be engaged by a slotted locking plate 48, each locking plate has engaged therewith a rod 49 slidably mounted in an aperture in one end of the housing 47, and positioned between the arm 50 of plate 48 and one end of the housing 47 is a coil spring 51 which normally urges the locking plate 48 toward one end of the housing so that the catch member 46 may be readily engaged by said plate.

As each one of the housings 47 has a movable rod 49, it will be noted that the outer ends of these rods are attached to a cross piece 52 which is connected up by means of a link 53 to the rockable arm 54. The rocking arm 54 has attached thereto a cord or cable 55 which leads over a sheave 56 and down into the cockpit of the cabin where a handle 57 is attached to the cord for manipulating the locking plates 48 simultaneously.

Extending upwardly from the top of the wing 5 are the spaced angular brackets 58 which are provided at their central portions with bearing sleeves 59 attached to the ends of shaft 60. The shaft 60 is carried by the bearing rod 60' and extending laterally from the sleeves 59 are the arms 61 carrying at their outer ends spaced arms 62 which are normally positioned within the housings 43 for supporting thereon the parachutes which are to be arranged in the housings 43.

The outer ends of arms 61, as stated heretofore, are provided with spaced arms 62 and arranged centrally of these two arms is an intermediate arm 63 mounted upon the cross piece 64. The spaced arms 62 extend through suitable openings 65 in the cover 44, so that the framework formed by the arms 62 and 63 is normally positioned within the housings 43.

The arms 61 are normally urged toward an upright position by means of the springs 66 which are coiled upon a supporting rod 67, with one end of each spring bearing against one of the brackets 58, while the other end of each spring is disposed at right angles, as shown at 68, and extended beneath each one of the arms 61 for normally urging the arms 61 towards a raised position.

Supported at the front side of the main wing 5, at preferably the central portion thereof, is a drum 69 having ratchet wheels 70 at each end thereof engaged by pivoted pawls 71. These pawls 71 are normally urged into engagement with the ratchets by means of the coil springs 72. The ratchets 71 are connected and can be simultaneously operated by means of a cross bar 73 which has leading therefrom a cable 74 adapted to lead down into close proximity to the pilot to be actuated by the pilot for disengaging the pawls from the ratchets 70. Each arm 61 carries a collar 75 having apertured ears extending from opposite sides thereof and connected to one of the ears is a cable 76 which leads down to and is wound around the drum 69. Thus, two distinct cables for the arms 61 are wound around the drum.

Attached to the apertured ear at the other side of the collar 75 is a restraining cable 77 which limits the upward swinging movement of each arm 61. The lower end of each cable 77 is attached to an eye 78 in the bottom of the housing 43.

In order to provide means for equalizing the movement of the arms 61, a second collar 75' is attached to each arm 61 and connected to one side of the collar is a cable 79 which leads down around a sheave 80 in each housing 43. The cable 79 after passing around the sheave 80 extends forwardly and around the drum 69 and thence upwardly to the apertured ear on the other side of collar 75'.

Attached to the outer ends of the arms 61 are the loops 81 to which the ropes of the parachutes 82 are attached. The framework 42 is supported from the fuselage 1 by means of standards 83, the lower ends of which are connected to the fuselage, while the upper ends are attached to the frame. Normally, the parachutes 82 are carried by the rear portion of the fuselage, but when in operative position are disposed above the main portion of the plane, and the connection with the arms 61 through the medium of the cable 77 is such as to provide suspension to equalize the weight of the plane.

It will be apparent that by constructing an aeroplane and embodying in the construction the housings 8 and 43, together with the operating mechanism therefor and the parachutes, the engine for the plane can become inoperative, and by releasing the parachutes, the descent of the machine can be retarded so as to permit the pilot to land the machine without any serious accident to the machine or its occupants.

In releasing the several parachutes, the operator will actuate the lever 24 for releasing the parachutes 9 which are attached to the main wing 5 of the aeroplane. Extending downwardly from the shaft 60 is an operating lever 84 which is adapted to be actuated to assist in maintaining the plane on an even keel.

When it is desired to release the parachutes 82, the handle 57 is grasped and by pulling on cable 55, the locking plates 48 can be disengaged from the catches 46 to release the cover members 44 of housings 43. By releasing the covers 44, the supporting frames for parachutes 82 are simultaneously released, springs 66 urging these parachutes 82 outwardly to an operative position. From the above it will be apparent that the several parachutes can be very quickly released.

I claim:

1. In an aeroplane, a fuselage, a pair of receptacles carried by the fuselage adjacent to the rear end thereof and disposed upon opposite sides thereof, a normally folded parachute arranged in each receptacle, a rock shaft mounted upon the fuselage arranged transversely of the longitudinal axis of said fuselage, a pair of masts carried by the rock shaft adjacent to the longitudinal center of the fuselage for swinging movement therewith, means connecting the parachutes with the masts, a pivoted cover for each receptacle for normally holding the parachutes therein, resilient means normally urging the covers to an open position, latches normally holding the covers in a closed position against the tension of said spring means, means for actuating the latches, and means for shifting the masts and parachutes when the masts and parachutes are in their operative position for maintaining the fuselage on an even keel, said means including an operating handle secured to the shaft and extending into the fuselage within reach of the pilot of the aeroplane.

2. In an aeroplane, a fuselage, and a wing, receptacles carried by the upper surface of the wing adjacent to the opposite ends thereof, a hinged cover for each receptacle, spring means normally urging the covers to an open position, a pivoted tray arranged within each one of the receptacles normally urged out of the receptacles when the covers are in their open positions, a parachute normally received within each receptacle and positioned on said tray and connected with the aeroplane, a rock shaft carried by the wing and extending into the receptacles, means for actuating the rock shaft from the interior of the fuselage, a sliding latch in each receptacle normally holding the covers in a lowered position, a pin on each latch, cranks on the rock shaft engaging the pins, whereby upon turning movement of the rock shaft in one direction the latches will be actuated, a sliding latch in each receptacle for normally holding the trays in a lowered position, a link pivotally connected to each of the last mentioned sliding latches, crank arms secured to the rock shaft extending toward the links, the links having slots therein, and pins carried by the crank arms received in the slots, whereby upon initial movement of the rock shaft and crank arms, movement will not be imparted to the last mentioned sliding latches and continued movement will actuate said sliding latches.

JOHN KRASNODMSKY.